US012619536B2

(12) United States Patent
Liu

(10) Patent No.: US 12,619,536 B2
(45) Date of Patent: May 5, 2026

(54) MEMORY CONTROLLER, MEMORY SYSTEM FOR DATASET MANAGEMENT HANDLING, METHOD, AND STORAGE MEDIUM THEREOF

(71) Applicant: YANGTZE MEMORY TECHNOLOGIES CO., LTD., Wuhan (CN)

(72) Inventor: Weilin Liu, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/236,045

(22) Filed: Aug. 21, 2023

(65) Prior Publication Data

US 2025/0028641 A1 Jan. 23, 2025

Related U.S. Application Data

(63) Continuation of application No. PCT/CN2023/108308, filed on Jul. 20, 2023.

(51) Int. Cl.
*G06F 12/0804* (2016.01)
*G06F 12/0873* (2016.01)

(52) U.S. Cl.
CPC ...... *G06F 12/0804* (2013.01); *G06F 12/0873* (2013.01)

(58) Field of Classification Search
CPC .......................... G06F 12/0804; G06F 12/0873
See application file for complete search history.

(56) References Cited

U.S. PATENT DOCUMENTS 11,126,602 B2 * 9/2021 Jeon ...................... G06F 3/0608
2012/0310998 A1 * 12/2012 Burka ................. G06F 9/45504
707/813

(Continued)

FOREIGN PATENT DOCUMENTS

CN 114077555 A 2/2022
CN 114385236 A 4/2022

(Continued)

OTHER PUBLICATIONS

International Search Report issued in corresponding International Application No. PCT/CN2023/108308, mailed on Mar. 28, 2024, 3 pages.

(Continued)

*Primary Examiner* — Prasith Thammavong
(74) *Attorney, Agent, or Firm* — BAYES PLLC

(57) ABSTRACT

In certain aspects, a memory controller includes a data classification accelerator, a deallocation accelerator, and a mapping table accelerator. The data classification accelerator is configured to divide a deallocated logical range into a set of deallocation zones. The set of deallocation zones includes one or more first deallocation zones which are classified into one or more aligned zones, respectively. The deallocation accelerator is operatively coupled to the data classification accelerator, and configured to update a dataset management (DSM) bitmap based on the one or more aligned zones. The mapping table accelerator is operatively coupled to the data classification accelerator and the deallocation accelerator. The mapping table accelerator is configured to, responsive to the updating of the DSM bitmap, generate a response indicating that the deallocated logical range is processed.

20 Claims, 11 Drawing Sheets

(56) References Cited

U.S. PATENT DOCUMENTS

| | | | |
|---|---|---|---|
| 2019/0227925 A1* | 7/2019 | Hsu | G06F 3/0652 |
| 2020/0081621 A1 | 3/2020 | Lin et al. | |
| 2020/0081830 A1* | 3/2020 | Desai | G06F 12/0246 |
| 2020/0218465 A1 | 7/2020 | Klein | |
| 2020/0403035 A1* | 12/2020 | Ogiwara | H10B 63/84 |
| 2021/0165735 A1 | 6/2021 | Chung | |
| 2022/0342808 A1 | 10/2022 | Porzio et al. | |
| 2023/0095644 A1 | 3/2023 | Das et al. | |
| 2023/0152968 A1 | 5/2023 | Kim et al. | |
| 2024/0069789 A1* | 2/2024 | Oh | G06F 3/0679 |

FOREIGN PATENT DOCUMENTS

| | | |
|---|---|---|
| CN | 114398297 A | 4/2022 |
| CN | 115269465 A | 11/2022 |
| CN | 116340213 A | 6/2023 |
| JP | 2018116329 A | 7/2018 |
| JP | 2022016899 A | 1/2022 |
| JP | 2022063466 A | 4/2022 |
| TW | 201510855 A | 3/2015 |
| TW | 202240387 A | 10/2022 |

OTHER PUBLICATIONS

Supplementary European Search Report issued in corresponding European Application No. 23924480.9, mailed on Jul. 29, 2025, 10 pages.

* cited by examiner

900

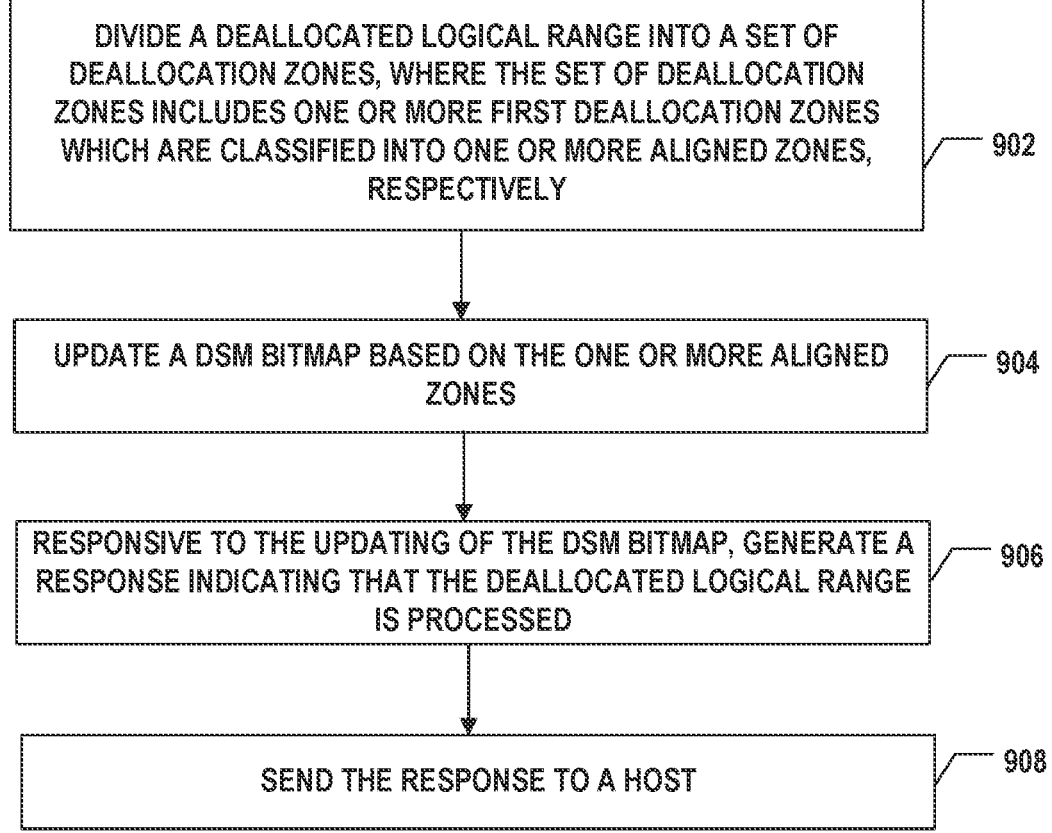

DIVIDE A DEALLOCATED LOGICAL RANGE INTO A SET OF DEALLOCATION ZONES, WHERE THE SET OF DEALLOCATION ZONES INCLUDES ONE OR MORE FIRST DEALLOCATION ZONES WHICH ARE CLASSIFIED INTO ONE OR MORE ALIGNED ZONES, RESPECTIVELY     — 902

UPDATE A DSM BITMAP BASED ON THE ONE OR MORE ALIGNED ZONES     — 904

RESPONSIVE TO THE UPDATING OF THE DSM BITMAP, GENERATE A RESPONSE INDICATING THAT THE DEALLOCATED LOGICAL RANGE IS PROCESSED     — 906

SEND THE RESPONSE TO A HOST     — 908

FIG. 9

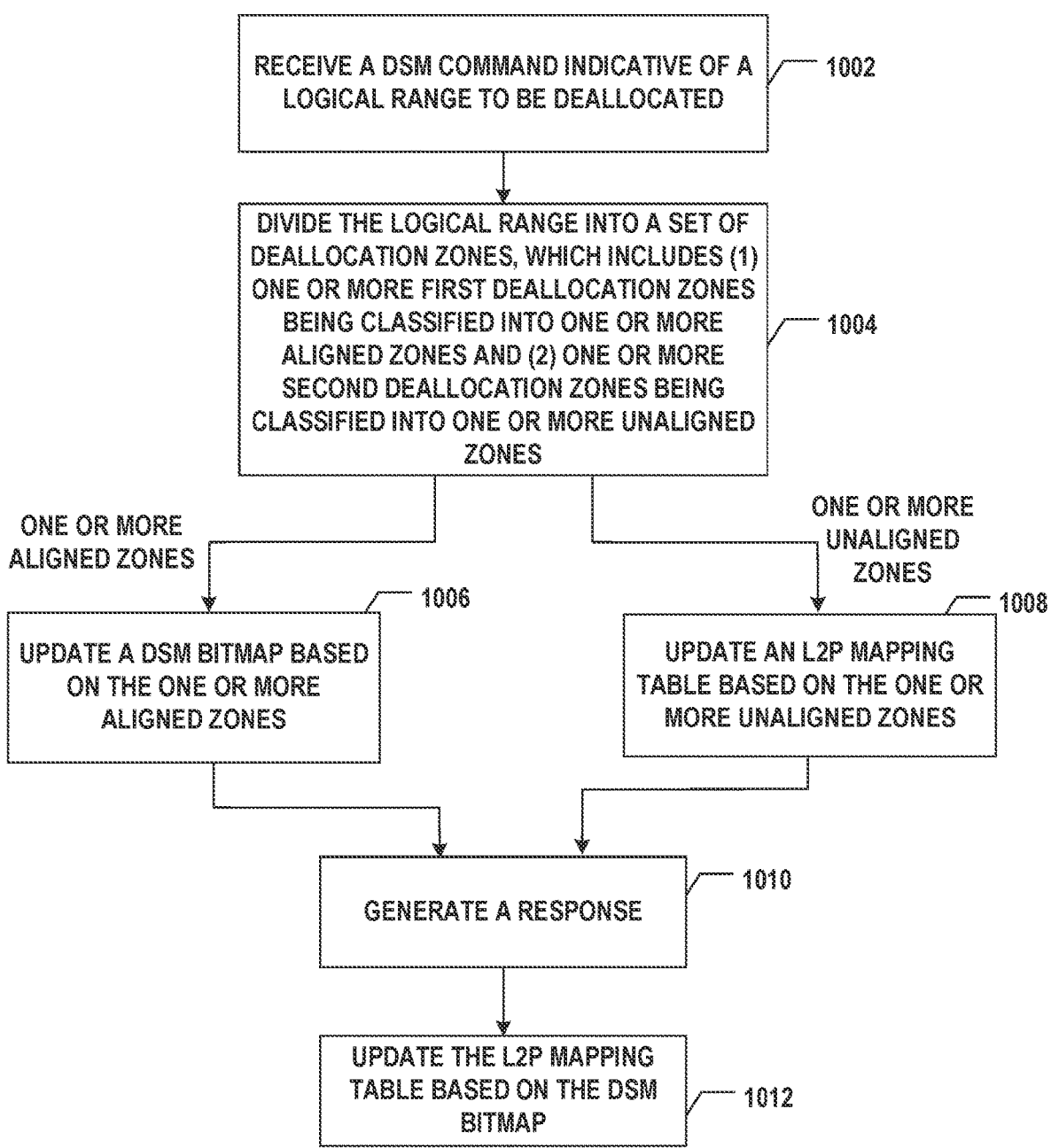

1000

RECEIVE A DSM COMMAND INDICATIVE OF A LOGICAL RANGE TO BE DEALLOCATED — 1002

DIVIDE THE LOGICAL RANGE INTO A SET OF DEALLOCATION ZONES, WHICH INCLUDES (1) ONE OR MORE FIRST DEALLOCATION ZONES BEING CLASSIFIED INTO ONE OR MORE ALIGNED ZONES AND (2) ONE OR MORE SECOND DEALLOCATION ZONES BEING CLASSIFIED INTO ONE OR MORE UNALIGNED ZONES — 1004

ONE OR MORE ALIGNED ZONES

ONE OR MORE UNALIGNED ZONES

UPDATE A DSM BITMAP BASED ON THE ONE OR MORE ALIGNED ZONES — 1006

UPDATE AN L2P MAPPING TABLE BASED ON THE ONE OR MORE UNALIGNED ZONES — 1008

GENERATE A RESPONSE — 1010

UPDATE THE L2P MAPPING TABLE BASED ON THE DSM BITMAP — 1012

FIG. 10

MEMORY CONTROLLER, MEMORY SYSTEM FOR DATASET MANAGEMENT HANDLING, METHOD, AND STORAGE MEDIUM THEREOF

CROSS-REFERENCE TO RELATED APPLICATIONS

This application is a continuation of International Application No. PCT/CN2023/108308, filed on Jul. 20, 2023, entitled "MEMORY CONTROLLER, MEMORY SYSTEM FOR DATASET MANAGEMENT HANDLING, METHOD, AND STORAGE MEDIUM THEREOF," which is incorporated herein by reference in its entirety.

BACKGROUND

The present disclosure relates to memory controller, memory systems, and operation methods thereof.

Solid-state drives (SSDs) are a type of non-volatile data storage devices that have gained significant popularity in recent years due to their numerous advantages over traditional hard disk drives (HDDs), such as faster read and write speed, durability and reliability, reduced power consumption, silent operation, and smaller form factors. SSDs typically may use NAND Flash memory for non-volatile storage. Some SSDs, for example enterprise SSDs, also may use volatile memory (e.g., dynamic random-access memory (DRAM)) to enhance their performance, allowing faster access to data and more efficient handling of read and write operations.

SUMMARY

In one aspect, a memory controller includes a data classification accelerator, a deallocation accelerator, and a mapping table accelerator. The data classification accelerator is configured to divide a deallocated logical range into a set of deallocation zones. The set of deallocation zones includes one or more first deallocation zones which are classified into one or more aligned zones, respectively. The deallocation accelerator is operatively coupled to the data classification accelerator, and configured to update a dataset management (DSM) bitmap based on the one or more aligned zones. The mapping table accelerator is operatively coupled to the data classification accelerator and the deallocation accelerator. The mapping table accelerator is configured to, responsive to the updating of the DSM bitmap, generate a response indicating that the deallocated logical range is processed.

In some implementations, the mapping table accelerator is further configured to update a logical-to-physical (L2P) mapping table based on the DSM bitmap.

In some implementations, to update the L2P mapping table based on the DSM bitmap, the mapping table accelerator is further configured to identify the one or more aligned zones from the DSM bitmap, and update the L2P mapping table based on the one or more aligned zones.

In some implementations, to update the L2P mapping table based on the one or more aligned zones, the mapping table accelerator is further configured to identify a first list of logical addresses within the one or more aligned zones, and invalidate the first list of logical addresses in the L2P mapping table.

In some implementations, the set of deallocation zones further includes one or more second deallocation zones which are classified into one or more unaligned zones, respectively. The mapping table accelerator is further configured to update the L2P mapping table based on the one or more unaligned zones, and generate the response responsive to both the updating of the DSM bitmap and the updating of the L2P mapping table based on the one or more unaligned zones.

In some implementations, to update the L2P mapping table based on the one or more unaligned zones, the mapping table accelerator is further configured to identify a second list of logical addresses within the one or more unaligned zones, and invalidate the second list of logical addresses in the L2P mapping table.

In some implementations, the data classification accelerator is configured to divide the deallocated logical range into the set of deallocation zones based on a zone division of a logical space of a non-volatile memory device coupled to the memory controller, such that the division of the deallocated logical range matches the zone division of the logical space of the non-volatile memory device.

In some implementations, the logical space of the non-volatile memory device is divided into a plurality of logical zones. The one or more first deallocation zones are equal to one or more first logical zones from the plurality of logical zones, respectively, such that the one or more first deallocation zones are classified into the one or more aligned zones which are aligned with the one or more first logical zones, respectively. The one or more second deallocation zones are smaller than one or more second logical zones from the plurality of logical zones, respectively, such that the one or more second deallocation zones are classified into the one or more unaligned zones which are unaligned with the one or more second logical zones, respectively.

In some implementation, the non-volatile memory device includes NAND Flash memory.

In another aspect, a memory system includes a non-volatile memory device and a memory controller operatively coupled to the non-volatile memory device. The memory controller is configured to control the non-volatile memory device. The memory controller includes a data classification accelerator, a deallocation accelerator, and a mapping table accelerator. The data classification accelerator is configured to divide a deallocated logical range into a set of deallocation zones. The set of deallocation zones includes one or more first deallocation zones which are classified into one or more aligned zones, respectively. The deallocation accelerator is operatively coupled to the data classification accelerator, and configured to update a DSM bitmap based on the one or more aligned zones. The mapping table accelerator is operatively coupled to the data classification accelerator and the deallocation accelerator. The mapping table accelerator is configured to, responsive to the updating of the DSM bitmap, generate a response indicating that the deallocated logical range is processed.

In some implementations, the mapping table accelerator is further configured to update an L2P mapping table based on the DSM bitmap.

In some implementations, to update the L2P mapping table based on the DSM bitmap, the mapping table accelerator is further configured to identify the one or more aligned zones from the DSM bitmap, and update the L2P mapping table based on the one or more aligned zones.

In some implementations, to update the L2P mapping table based on the one or more aligned zones, the mapping table accelerator is further configured to identify a first list of logical addresses within the one or more aligned zones, and invalidate the first list of logical addresses in the L2P mapping table.

In some implementations, the set of deallocation zones further includes one or more second deallocation zones which are classified into one or more unaligned zones, respectively. The mapping table accelerator is further configured to update the L2P mapping table based on the one or more unaligned zones, and generate the response responsive to both the updating of the DSM bitmap and the updating of the L2P mapping table based on the one or more unaligned zones.

In some implementations, to update the L2P mapping table based on the one or more unaligned zones, the mapping table accelerator is further configured to identify a second list of logical addresses within the one or more unaligned zones, and invalidate the second list of logical addresses in the L2P mapping table.

In some implementations, the data classification accelerator is configured to divide the deallocated logical range into the set of deallocation zones based on a zone division of a logical space of the non-volatile memory device, such that the division of the deallocated logical range matches the zone division of the logical space of the non-volatile memory device.

In some implementations, the logical space of the non-volatile memory device is divided into a plurality of logical zones. The one or more first deallocation zones are equal to one or more first logical zones from the plurality of logical zones, respectively, such that the one or more first deallocation zones are classified into the one or more aligned zones which are aligned with the one or more first logical zones, respectively. The one or more second deallocation zones are smaller than one or more second logical zones from the plurality of logical zones, respectively, such that the one or more second deallocation zones are classified into the one or more unaligned zones which are unaligned with the one or more second logical zones, respectively.

In some implementations, the non-volatile memory device includes NAND Flash memory.

In still another aspect, a method for operating a memory controller is provided. A deallocated logical range is divided into a set of deallocation zones. The set of deallocation zones includes one or more first deallocation zones which are classified into one or more aligned zones, respectively. A DSM bitmap is updated based on the one or more aligned zones. Responsive to the updating of the DSM bitmap, a response indicating that the deallocated logical range is processed.

In some implementations, an L2P mapping table is updated based on the DSM bitmap.

In some implementations, updating the L2P mapping table based on the DSM bitmap includes identifying the one or more aligned zones from the DSM bitmap, and updating the L2P mapping table based on the one or more aligned zones.

In some implementations, updating the L2P mapping table based on the one or more aligned zones includes identifying a first list of logical addresses within the one or more aligned zones, and invalidating the first list of logical addresses in the L2P mapping table.

In some implementations, the set of deallocation zones further includes one or more second deallocation zones which are classified into one or more unaligned zones, respectively. The method further includes updating the L2P mapping table based on the one or more unaligned zones, and generating the response responsive to both the updating of the DSM bitmap and the updating of the L2P mapping table based on the one or more unaligned zones.

In some implementations, updating the L2P mapping table based on the one or more unaligned zones includes identifying a second list of logical addresses within the one or more unaligned zones, and invalidating the second list of logical addresses in the L2P mapping table.

In some implementations, dividing the deallocated logical range into the set of deallocation zones includes dividing the deallocated logical range into the set of deallocation zones based on a zone division of a logical space of a non-volatile memory device coupled to the memory controller, such that the division of the deallocated logical range matches the zone division of the logical space of the non-volatile memory device.

In some implementations, the logical space of the non-volatile memory device is divided into a plurality of logical zones. The one or more first deallocation zones are equal to one or more first logical zones from the plurality of logical zones, respectively, such that the one or more first deallocation zones are classified into the one or more aligned zones which are aligned with the one or more first logical zones, respectively. The one or more second deallocation zones are smaller than one or more second logical zones from the plurality of logical zones, respectively, such that the one or more second deallocation zones are classified into the one or more unaligned zones which are unaligned with the one or more second logical zones, respectively.

In some implementations, the non-volatile memory device includes NAND Flash memory.

In yet another aspect, a non-transitory computer-readable storage medium storing instructions is disclosed. The instructions, when executed by a memory controller of a memory system, cause the memory controller to perform a method. The method includes dividing a deallocated logical range into a set of deallocation zones. The set of deallocation zones includes one or more first deallocation zones which are classified into one or more aligned zones, respectively. The method also includes updating a DSM bitmap based on the one or more aligned zones. Responsive to the updating of the DSM bitmap, the method further includes generating a response indicating that the deallocated logical range is processed.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 9 illustrates a flowchart of a method for operating a memory controller, according to some aspects of the present disclosure.

FIG. 10 illustrates a flowchart of another method for operating a memory controller, according to some aspects of the present disclosure.

Figure 1:
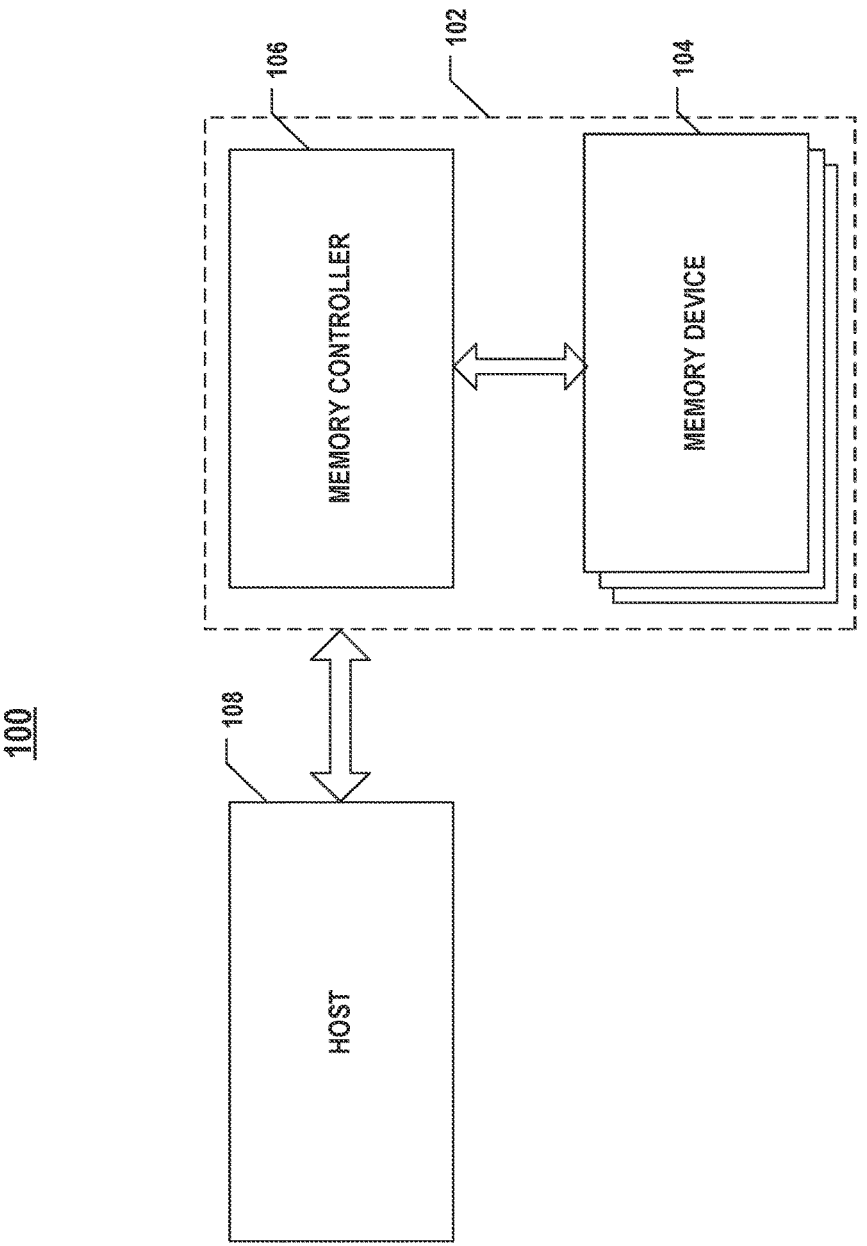
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The non-volatile memory express (NVMe) specification defines a DSM command which can be used to mark unused host data space to improve the performance of the host. For example, the DSM command may indicate a logical range to be deallocated (or released) by a host. Responsive to receiving the DSM command, a memory controller coupled to a non-volatile memory device may handle the deallocation of the logical range. For example, the memory controller may deallocate or release one or more logical addresses such as logical block addresses (LBAs) included in the DSM command. In a further example, the memory controller may deallocate or release the one or more logical addresses from a logical space of the non-volatile memory device coupled to the memory controller. If the logical range has a small size, the memory controller may deallocate the logical range quickly. A DSM response time (e.g., a time for sending a response indicating completion of the deallocation to the host) is short. However, if the logical range has a large size, the deallocation of the logical range by the memory controller may consume a significant amount of time. The DSM response time to the host is long, which may impact the read/write input/output (I/O) latency of the host.

To address the aforementioned issue, the present disclosure introduces a handling scheme that can shorten a DSM response time associated with the deallocation of large-size logical ranges, thereby reducing the impact of the DSM handling on the host I/O latency. Specifically, a DSM command may instruct to deallocate a large-size logical range. The large-size logical range may be divided into a set of deallocation zones, which may include at least one of (1) one or more first deallocation zones which are classified into one or more aligned zones, respectively; or (2) one or more second deallocation zones which are classified into one or more unaligned zones, respectively. The one or more unaligned zones may be processed directly to update an L2P mapping table, such that a list of logical addresses within the one or more unaligned zones can be marked as invalid addresses in the L2P mapping table. On the other hand, the one or more aligned zones can be processed to update a DSM bitmap to record corresponding deallocation information in the DSM bitmap. Then, a response indicating that the deallocated logical range is processed can be generated and sent to the host even before the L2P mapping table is updated for the one or more aligned zones. Afterward, the one or more aligned zones can be deallocated in the background based on the DSM bitmap after the response is sent to the host, such that another list of logical addresses within the one or more aligned zones can be marked as invalid addresses in the L2P mapping table. Thus, a DSM response time for the DSM command can be reduced for the DSM handling because the response can be sent to the host before the one or more aligned zones are actually deallocated by the memory controller. The impact of the DSM handling on the host I/O latency can be reduced.

It is contemplated that the handling scheme disclosed herein can not only be applied to handle DSM commands associated with the NVMe specification, but also can be applied to handle commands associated with other standards, which is not limited herein. For example, the handling scheme disclosed herein can also be applied to handle a Trim command. The Trim command is a command that notifies a Solid State Drive (SSD) which LBAs are no longer needed by a host. The SSD may update its own internal record (e.g., by updating corresponding entries in a logical-to-physical (L2P) mapping table to blank address, clearing corresponding bits in a valid page bitmap, updating a valid page count, etc.) to mark the LBAs as invalid. The SSD may no longer move the LBAs marked internally as invalid blocks during garbage collection, which eliminates the time wasted in order to rewrite invalid data to new flash pages. In another example, the handling scheme disclosed herein can also be applied to handle an UNMAP command, which is a Small Computer System Interface (SCSI) command that a host can issue to a storage array to free LBAs that no longer need to be allocated.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, L2P address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
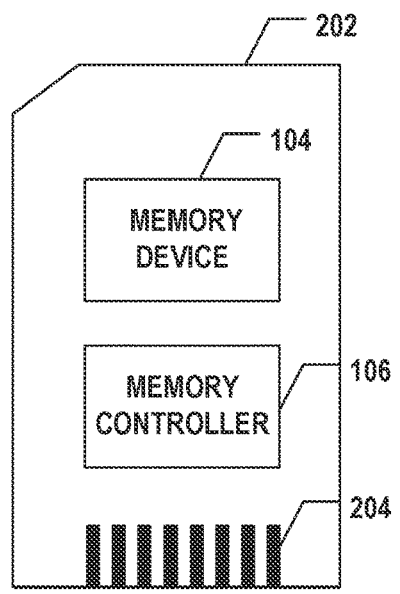
FIG. 2A illustrates a diagram of a memory card having a memory device, according to some aspects of the present disclosure.
Figure 2B:
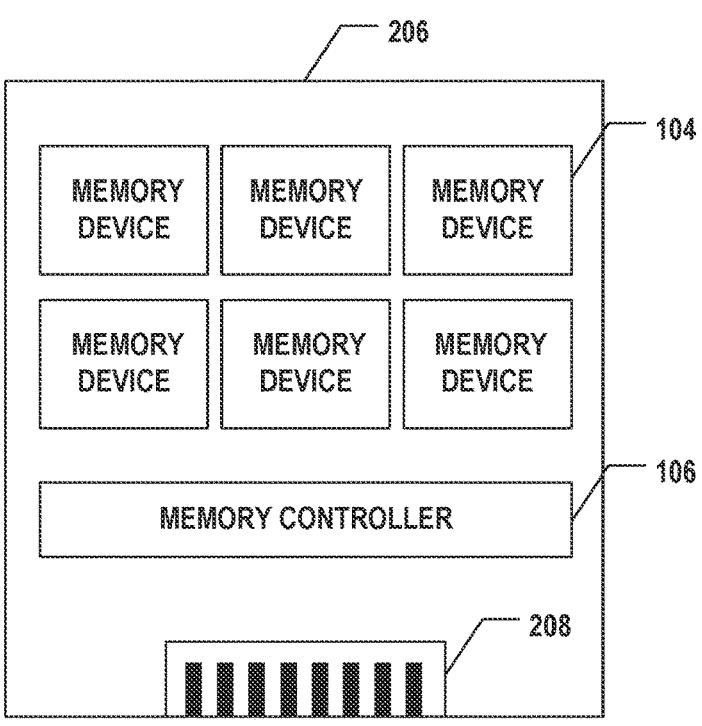
FIG. 2B illustrates a diagram of an SSD having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
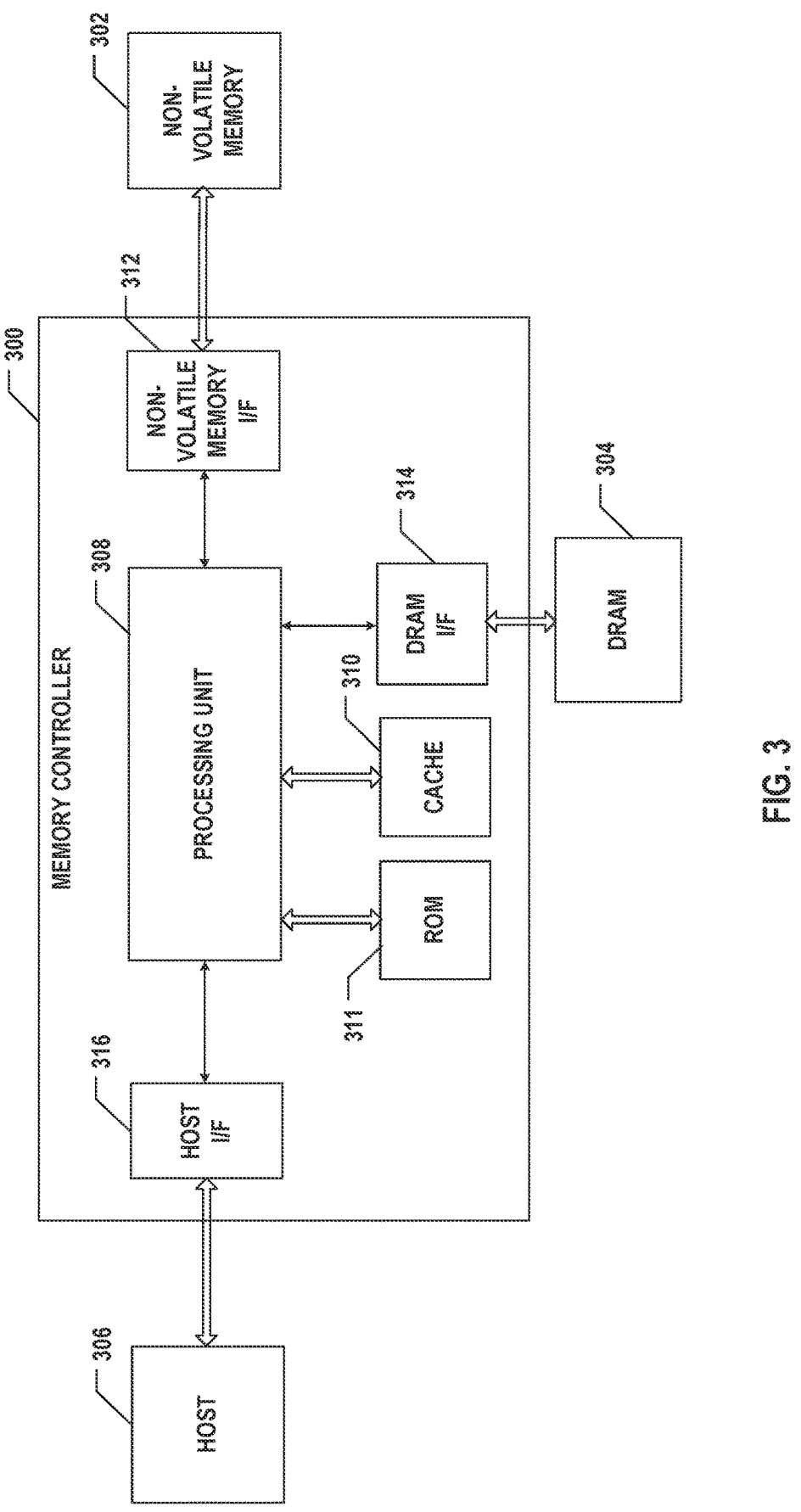
FIG. 3 illustrates a block diagram of a memory controller, according to some aspects of the present disclosure.

FIG. 3 illustrates a block diagram of a memory controller 300, according to some aspects of the present disclosure. Memory controller 300 may be one example of memory controller 106 in FIG. 1. As shown in FIG. 3, memory controller 300 can include a processing unit 308, a cache 310, and a read-only memory (ROM) 311. In some implementations, processing unit 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processing unit 308. In some implementations, processing unit 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a non-volatile memory interface 312, a DRAM interface 314, and a host interface 316 operatively coupled to a non-volatile memory device 302, DRAM 304 (e.g., an example of volatile memory devices), and a host 306 (e.g., an example of host 108), respectively. Non-volatile memory interface 312, DRAM interface 314, and host interface 316 can be configured to transfer data, command, clock, or any suitable signals between processing unit 308 and non-volatile memory device 302, DRAM 304, and host 306, respectively. Non-volatile memory interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered as volatile memory devices that can be controlled and accessed by memory controller 300 in a memory system. Consistent with the scope of the present disclosure, a cache can be implemented as part of volatile memory devices, for example, by an SRAM and/or DRAM 304. It is understood that although FIG. 3 shows that cache 310 is within memory controller 300, and DRAM 304 is outside of memory controller 300. In some examples, both cache 310 and DRAM 304 may be within memory controller 300 or outside of memory controller 300.

Figure 4:
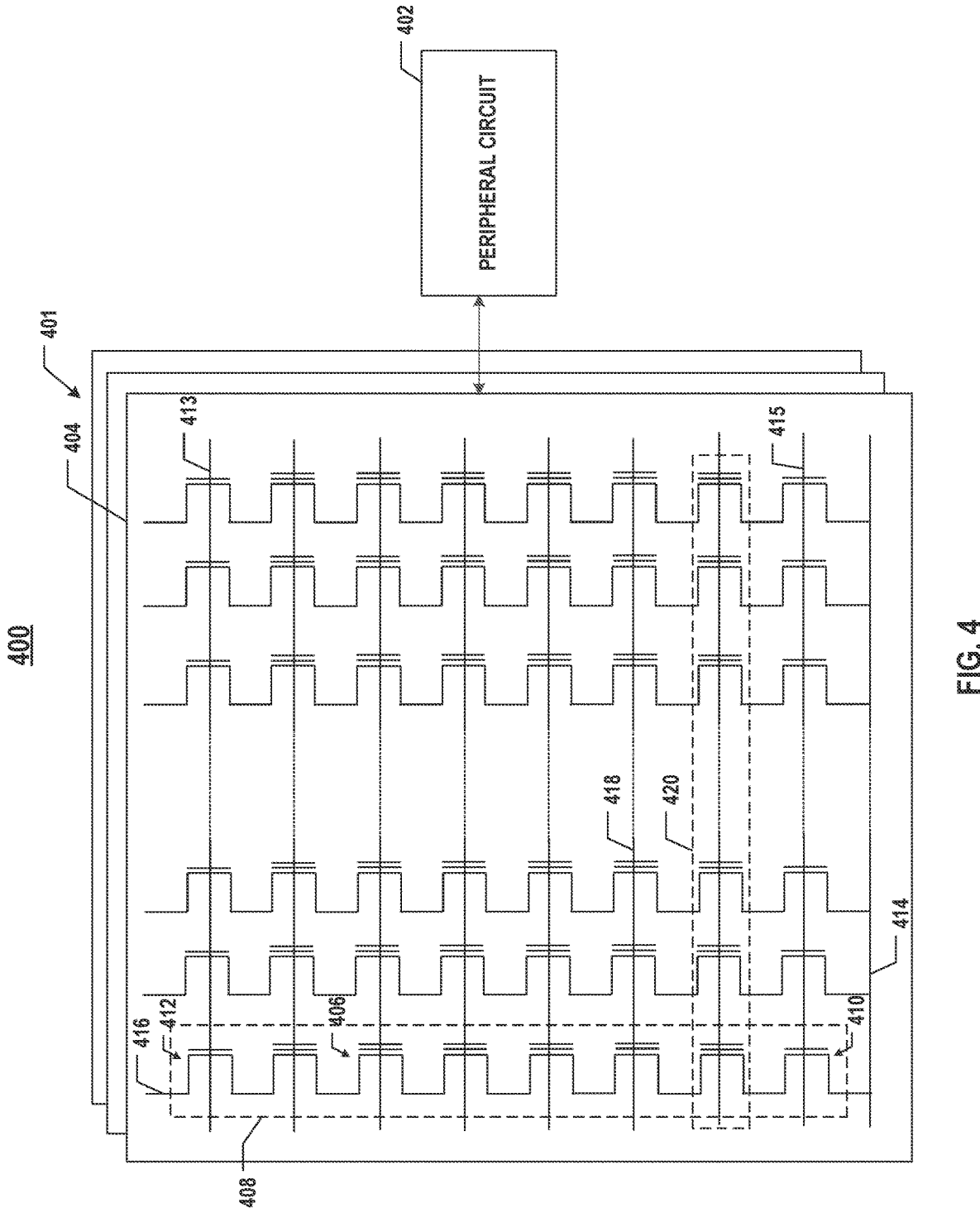
FIG. 4 illustrates a schematic diagram of a NAND Flash memory device including peripheral circuits, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of non-volatile memory device 302 in FIG. 3. NAND Flash memory device 400 can include a memory cell array 401 and peripheral circuits 402 operatively coupled to memory cell array 401. Memory cells 406 in memory cell array 401 are provided in the form of an array of memory strings 408 each extending vertically above a substrate (not shown). In some implementations, each memory string 408 includes a plurality of memory cells 406 operatively coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state "0" can correspond to a first range of threshold voltages, and the second state "1" can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a. quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 1. N may denote the total number of bits per cell. For example, N=2 for MLC, N=3 for TLC, or N=4 for QLC.

As shown in FIG. 4, each memory string 408 can also include a source select gate (SSG) transistor 410 at its source end and a drain select gate (DSG) transistor 412 at its drain end. SSG transistor 410 and DSG transistor 412 can be configured to activate select memory strings 408 (columns of the array) during read and program operations. In some implementations, the sources of memory strings 408 in the same block 404 are coupled through a same source line (SL) 414, e.g., a common SL. In other words, all memory strings 408 in the same block 404 have an array common source (ACS), according to some implementations. The drain of each memory string 408 is coupled to a respective bit line 416 from which data can be read or written via an output bus (not shown), according to some implementations. In some implementations, each memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more).

Memory cells 406 of adjacent memory strings 408 can be coupled through word lines 418 that select which row of memory cells 406 is affected by read and program operations. In some implementations, each word line 418 is coupled to a physical page 420 of memory cells 406, which is the basic data unit for read and write (program) operations. The size of one physical block 404. Each word line 418 can include a plurality of control gates (gate electrodes) at each memory cell 406 in respective physical page 420 and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies.

Figure 5:
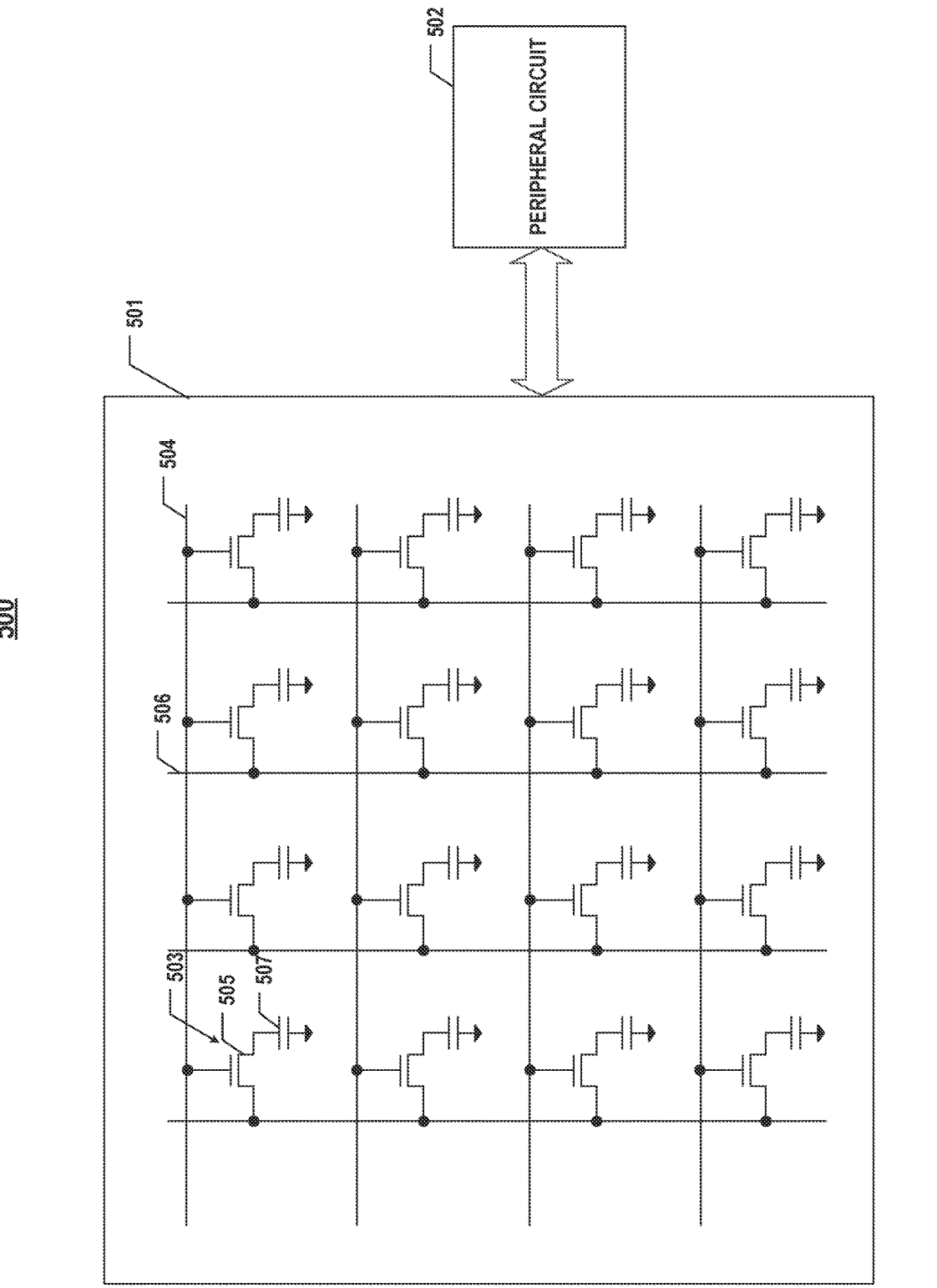
FIG. 5 illustrates a schematic diagram of a DRAM device including peripheral circuits, according to some aspects of the present disclosure.

FIG. 5 illustrates a schematic circuit diagram of a DRAM device 500 including peripheral circuits 502, according to some aspects of the present disclosure. DRAM device 500 may be one example of DRAM 304 in FIG. 3. DRAM device 500 can include a memory cell array 501 and peripheral circuits 502 operatively coupled to memory cell array 501. Memory cells 503 can be arranged in memory cell array 501 having rows and columns. DRAM device 500 requires periodic refreshing of memory cells 503. In some implementations, each memory cell 503 includes a capacitor 507 for storing a bit of data as a positive or negative electrical charge as well as a transistor 505 that controls access to capacitor 507. That is, each memory cell 503 shown in FIG. 5 is a one-transistor, one-capacitor (1T1C) cell, according to some implementations.

DRAM device 500 can include word lines 504 coupling peripheral circuits 502 and memory cell array 501 for controlling the switch of transistors 505 in memory cells 503 located in a row, as well as bit lines 506 coupling peripheral circuits 502 and memory cell array 501 for sending data to and/or receiving data from memory cells 503 located in a column. That is, each word line 504 is coupled to a respective row of memory cells 503, and each bit line 506 is coupled to a respective column of memory cells 503. The gate of transistor 505 can be coupled to word line 504, one of the source and the drain of transistor 505 can be coupled to bit line 506, the other one of the source and the drain of transistor 505 can be coupled to one electrode of capacitor 507, and the other electrode of capacitor 507 can be coupled to the ground.

Peripheral circuits 502 can be coupled to memory cell array 501 through bit lines 506, word lines 504, and any other suitable metal wirings. Peripheral circuits 502 can include any suitable circuits for facilitating the operations of memory cell array 501 by applying and sensing voltage signals and/or current signals through word lines 504 and bit lines 506 to and from each memory cell 503. Peripheral circuits 502 can include various types of peripheral circuits formed using CMOS technologies.

Figure 6:
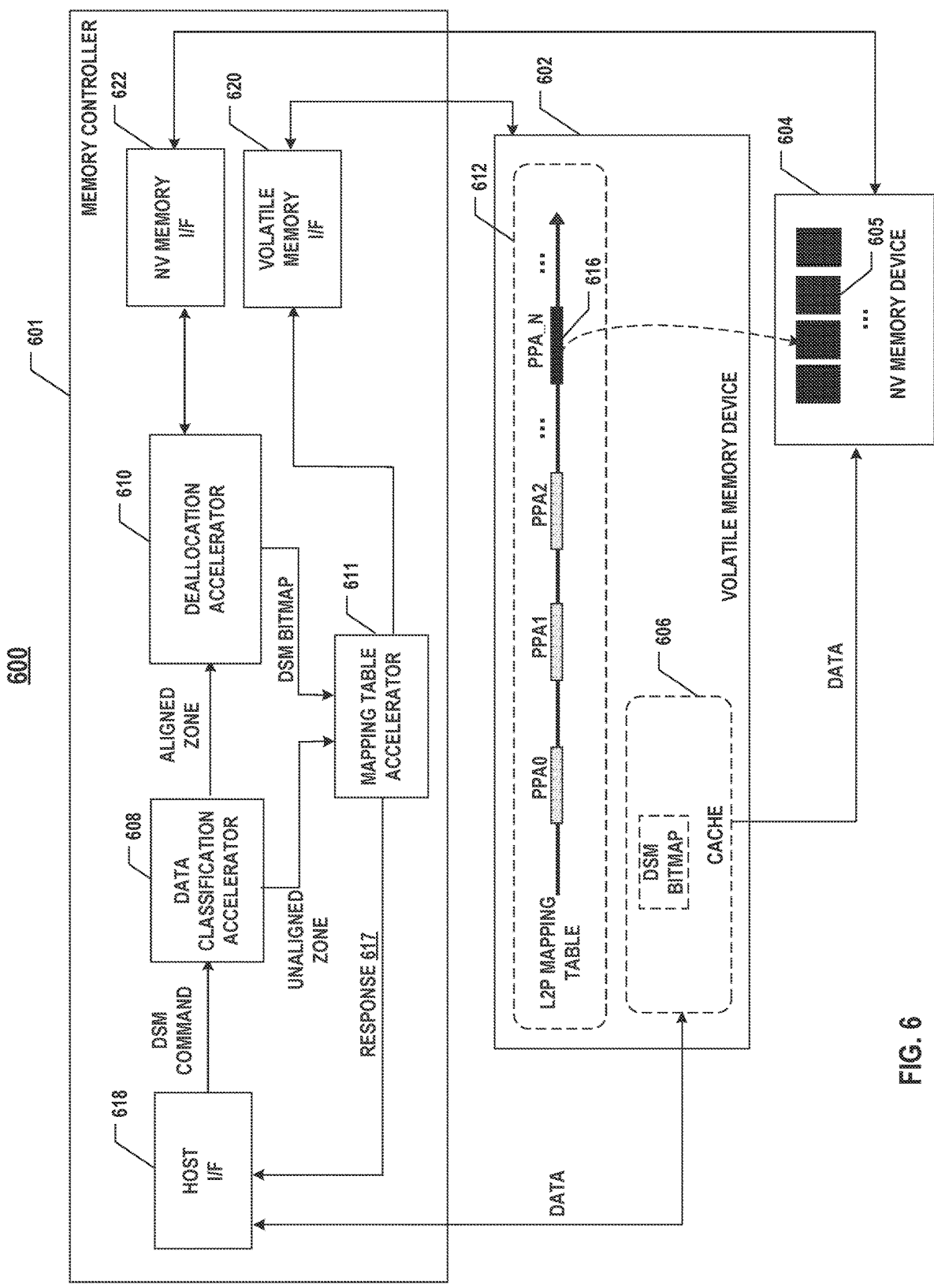
FIG. 6 illustrates a detailed schematic diagram of a memory system for DSM handling, according to some aspects of the present disclosure.

FIG. 6 illustrates a detailed schematic diagram of a memory system 600 for DSM handling, according to some aspects of the present disclosure. Memory system 600 may be one example of memory system 102 in FIG. 1. As shown in FIG. 6, memory system 600 can include a memory controller 601, a volatile memory device 602, and a non-volatile memory device 604. Memory controller 601 may be one example of memory controller 106 in FIG. 1. Volatile memory device 602 and non-volatile memory device 604 may be examples of memory devices 104 in FIG. 1. In some implementations, volatile memory device 602 includes DRAM (e.g., DRAM device 500 in FIG. 5), and non-volatile memory device 604 includes NAND Flash memory (e.g., NAND Flash memory device 400 in FIG. 4). In some implementations, memory controller 601 is further configured to cache a piece of host/user data in volatile memory device 602 or flush the piece of host/user data from volatile memory device 602 to non-volatile memory device 604.

To enable data search and access, non-volatile memory device 604 can be divided into multiple memory regions 605 each has a unique physical address. In some implementations, each memory region 605 includes one or more logical pages, for example, a portion (e.g., ½, ¼, or ⅛) of one physical page 420 of NAND Flash memory device 400. For example, the size of each memory region 605 may be 4,096 bytes. It is understood that memory region 605 may correspond to any suitable memory cell groups in non-volatile memory device 604 besides pages, such as portions of a page, blocks (e.g., blocks 404 of NAND Flash memory device 400), etc. For example, the physical address of memory region 605 can be referred to as a physical allocation address (PAA), and a logical address corresponding to the PAA can be referred to as a logical allocation address (LAA). In another example, the physical address of memory region 605 can be a physical page address (PPA) when memory region 605 corresponds to a page of non-volatile memory device 604, and a logical address corresponding to the PPA can be a logical block address (LBA).

Cache 606 can be a portion of volatile memory device 602 that temporarily stores (caches) the frequently used and/or recently accessed data to speed up the read and write operations of non-volatile memory device 604. Any suitable caching algorithms can be used to determine which data should be stored in cache 606 and when it should be replaced, including, for example, least recently used (LRU), most recently used (MRU), and first-in, first-out (FIFO). In some implementations, data from the host (host/user data) is first cached in cache 606 of volatile memory device 602, and flushed to non-volatile memory device 604 under certain conditions based on the caching algorithm. For example, when the size of the data in cache 606 reaches a preset threshold (maximum caching size), data in cache 606 may be flushed to non-volatile memory device 604. Cache 606 can be implemented by any suitable type of volatile memory device 602, for example, DRAM 304 and/or an SRAM.

In some implementations, a DSM bitmap can be stored in cache 606, whereas in some other implementations the DSM bitmap can be stored in a register (not shown) of memory controller 601. It is understood that the DSM bitmap may also be stored in non-volatile memory device 604, which is not limited herein.

To enable search and access of the data, an L2P mapping table 612 can be maintained and stored in volatile memory device 602 to map the logical addresses of data to the physical addresses 616 (e.g., PPAs) of memory regions 605 in non-volatile memory device 604, respectively. The logical addresses can identify the host/user data and be known to memory controller 601. In some implementations, a logical address indicates the basic logical unit of data for each read or write operation, such as a logical block address (LBA). In some implementations, the size of each memory region 605 and the size of the data corresponding to each logical address may be the same. For example, the size of the data corresponding to each logical address may be 4,096 bytes as well. Since memory controller 601 operates based on logical addresses, as opposed to physical addresses (e.g., physical addresses 616), L2P mapping table 612 can be used to enable the conversion between the logical addresses and the physical addresses.

In some implementations, L2P mapping table 612 can be stored in non-volatile memory device 604. In some other implementations, L2P mapping table 612 can be stored in any suitable type of volatile memory device 602, such as DRAM 304 in FIG. 3. For example, the same volatile memory device 602, such as DRAM 304 in FIG. 3, includes both cache 606 and L2P mapping table 612. It is understood that in some examples, cache 606 and L2P mapping table

612 may be included in different volatile memory devices 602. For example, cache 606 may be included in an SRAM, while DRAM 304 may include L2P mapping table 612. Although L2P mapping table 612 is shown in FIG. 6 as being outside of cache 606, it is understood that in some examples, L2P mapping table 612 may be stored in cache 606 as well.

Figure 7:
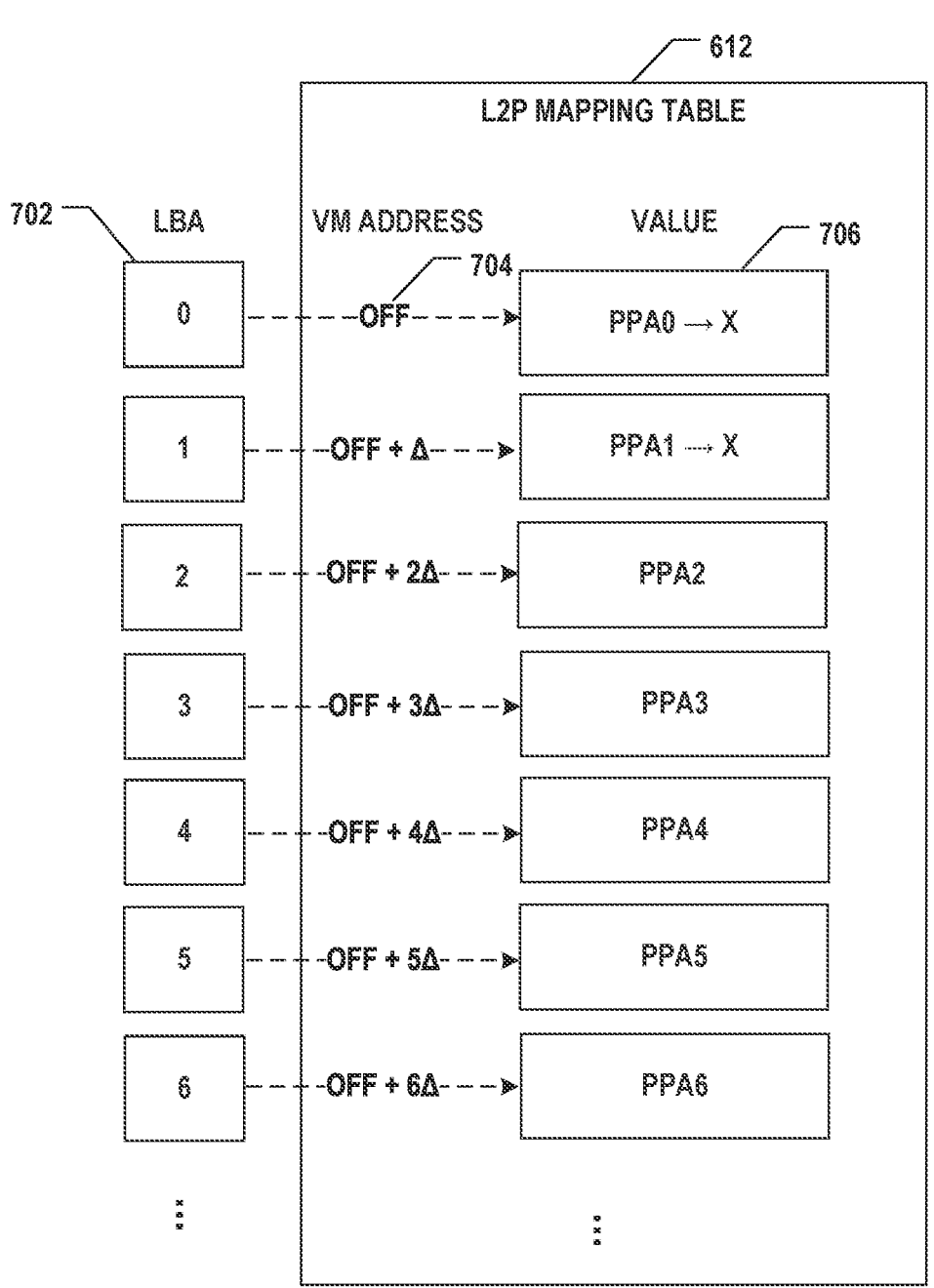
FIG. 7 illustrates an L2P mapping table, according to some aspects of the present disclosure.

In some implementations, L2P mapping table 612 can be stored in volatile memory device 602 with the addresses in volatile memory device 602. For example, as shown in FIG. 7, L2P mapping table 612 may include addresses 704 in volatile memory device 602 (Volatile Memory (VM) Address) each associated with a value 706. Values 706 may include physical addresses 616 (e.g., PPAs) of memory regions 605 in non-volatile memory device 604 (e.g., PPA1, PPA2, PPA3, PPA4, etc.). As shown in FIG. 7, L2P mapping table 612 may map logical addresses 702 (LBAs) of host/user data to physical addresses 616 of memory regions 605 in non-volatile memory device 604 through addresses 704. For example, for each piece of host/user data, a corresponding address 704 for an entry of L2P mapping table 612 in volatile memory device 602 may be determined based on the respective LBA 702 associated with the piece of host/user data. In one example as shown in FIG. 7, a respective LBA 702 (e.g., 0, 1, 2, 3, 4, 5, 6, etc.) associated with an entry can be multiplied by an entry size $\Delta$ and then added with an address offset (OFF) to form a corresponding address 704 of the entry (e.g., address $\mathbf{704}=\mathrm{OFF}+\mathrm{LBA}\times\Delta$), where the entry size $\Delta$ may represent a length of value 706 stored in the entry (e.g., $\Delta=4$ bytes). The address offset can be determined, for example, based on where L2P mapping table 612 is stored in volatile memory device 602. The corresponding value 706 at the determined address 704 of L2P mapping table 612 may thus be determined, which indicates a physical address 616 of a memory region in non-volatile memory device 604. As such, LBAs 702 of host/user data may be mapped to a plurality of physical addresses (e.g., physical addresses 616 of memory regions 605 in non-volatile memory device 604), respectively, by L2P mapping table 612.

Referring back to FIG. 6, memory controller 601 can include multiple I/O interfaces, including a volatile memory interface 620 operatively coupled to volatile memory device 602, a non-volatile memory interface 622 operatively coupled to non-volatile memory device 604, and a host interface 618 operatively coupled to cache 606 of volatile memory device 602 and the host (not shown). Examples of those I/O interfaces may include DRAM interface 314, non-volatile memory interface 312, and host interface 316 in FIG. 3, which may implement any suitable communication protocols facilitating data transfer, communication, and management, such as the NVMe protocol and PCI-E protocol, DDR protocol, to name a few.

Host interface 618 can be configured to receive write requests and read requests from the host. Each write request can be indicative of a piece of data associated with a logical address (e.g., LBA) to be written to memory system 600. Similarly, each read request can be indicative of a piece of data associated with a logical address (e.g., LBA) to be read from memory system 600. In some implementations, in response to receiving a write request or a read request, host interface 618 is also configured to fetch the piece of data from the host to temporarily store (cache) the piece of data in cache 606, or vice versa. For example, host interface 618 may include a direct memory access (DMA) unit that accesses data from and to cache 606.

In some implementations, host interface 618 can be configured to receive a DSM command from the host and send the DSM command to a data classification accelerator 608. The DSM command may be indicative of a deallocated logical range. For example, the DSM command may indicate a logical range to be deallocated from a logical space of non-volatile memory device 604. For example, the DSM command may indicate a logical range to be invalidated from a logical space of non-volatile memory device 604, such that the host (or memory controller 601) may no longer access the invalidated logical addresses within the logical range. In some implementations, host interface 618 may be configured to receive a response 617 for the DSM command from a mapping table accelerator 611 and send response 617 to the host. Data classification accelerator 608, mapping table accelerator 611, and response 617 are described below in more detail.

Non-volatile memory interface 622 can be configured to enable memory controller 601 to access data stored in non-volatile memory device 604 based on the physical addresses (e.g., PPAs) of memory regions 605. Volatile memory interface 620 can be configured to enable memory controller 601 to access data stored in volatile memory device 602, such as to manage L2P mapping table 612 and to access data in cache 606.

As shown in FIG. 6, memory controller 601 can further include data classification accelerator 608, a deallocation accelerator 610, and mapping table accelerator 611, which are operatively coupled to host interface 618, non-volatile memory interface 622, and volatile memory interface 620, respectively. In some implementations, data classification accelerator 608, deallocation accelerator 610, and mapping table accelerator 611 are firmware modules implemented by firmware codes/instructions stored in a memory (e.g., ROM 311 in FIG. 3 or non-volatile memory device 302 in FIG. 3) and executed by a processing unit (e.g., processing unit 308 in FIG. 3). In some implementations, data classification accelerator 608, deallocation accelerator 610, and mapping table accelerator 611 are implemented by software using codes/instructions stored in a memory (e.g., ROM 311 in FIG. 3 or non-volatile memory device 302 in FIG. 3) and executed by a processing unit (e.g., processing unit 308 in FIG. 3). In some implementations, data classification accelerator 608, deallocation accelerator 610, and mapping table accelerator 611 are hardware modules implemented by dedicated circuits, such as ASICs, for performing their dedicated functions described herein. The hardware implementation of data classification accelerator 608, deallocation accelerator 610, and mapping table accelerator 611 can reduce firmware overhead, thereby improving the performance of memory system 600.

Data classification accelerator 608 can be configured to receive the DSM command from host interface 618. The DSM command may indicate a logical range to be deallocated (e.g., a logical range to be allocated from a logical space of non-volatile memory device 604). Data classification accelerator 608 may divide the logical range into a set of deallocation zones. For example, data classification accelerator 608 may divide the logical range into a set of deallocation zones based on a zone division of the logical space of non-volatile memory device 604, such that the division of the logical range matches the zone division of the logical space of non-volatile memory device 604.

For example, the logical space of non-volatile memory device 604 can be divided into a plurality of logical zones (e.g., each logical zone having a size of 16 MiB). Then, the logical range can be split into a set of deallocation zones, such that each deallocation zone can be either identical to a particular logical zone from the plurality of logical zones (e.g., the deallocation zone having the same boundaries as the particular logical zone) or smaller than a particular logical zone from the plurality of logical zones (e.g., the deallocation zone being within the boundaries of the particular logical zone). If a deallocation zone is identical to a particular logical zone, the deallocation zone can be classified into an aligned zone, indicating that the deallocation zone is aligned with the particular logical zone. If the deallocation zone is smaller than a particular logical zone and within the particular logical zone, the deallocation zone can be classified into an unaligned zone, indicating that the deallocation zone is unaligned with the particular logical zone. Examples of aligned zones and unaligned zones are illustrated below with reference to FIGS. 8A-8B.

In some implementations, the set of deallocation zones divided from the logical range may include one or more first deallocation zones which are classified into one or more aligned zones, respectively. For example, the one or more first deallocation zones can be equal to one or more first logical zones from the plurality of logical zones, respectively, such that the one or more first deallocation zones can be classified into one or more aligned zones, which are aligned with the one or more first logical zones, respectively. In some implementations, the set of deallocation zones may include one or more second deallocation zones, which are classified into one or more unaligned zones, respectively. For example, the one or more second deallocation zones can be smaller than one or more second logical zones from the plurality of logical zones, respectively, such that the one or more second deallocation zones can be classified into the one or more unaligned zones, which are unaligned with the one or more second logical zones, respectively. In some other implementations, the set of deallocation zones may include a combination of (1) one or more first deallocation zones, which are classified into one or more aligned zones, respectively; and (2) one or more second deallocation zones, which are classified into one or more unaligned zones, respectively.

Deallocation accelerator 610 may be configured to update a DSM bitmap based on the one or more aligned zones. Initially, a DSM bitmap may be generated and initiated for the plurality of logical zones of non-volatile memory device 604. For example, the DSM bitmap may include a plurality of bits for the plurality of logical zones, respectively, where each bit corresponds to a respective logical zone and is initiated to have a first value (e.g., "0"). Next, for each aligned zone, deallocation accelerator 610 may update the DSM bitmap to modify a corresponding bit of the aligned zone to have a second value (e.g., "1"). The corresponding bit having the second value may indicate that the aligned zone (or equivalently, a logical zone that is identical to the aligned zone) is to be deallocated from the logical space of non-volatile memory device 604. Then, deallocation accelerator 610 may send the updated DSM bitmap to mapping table accelerator 611. Examples of the DSM bitmap are illustrated below with reference to FIGS. 8A-8B.

Mapping table accelerator 611 may be configured to update L2P mapping table 612 based on the one or more unaligned zones, the DSM bitmap, or both, as described below in more detail. Consistent with some implementations of the present disclosure, the set of deallocation zones divided from the logical range may include one or more first deallocation zones which are classified into one or more aligned zones, respectively. In this case, deallocation accelerator 610 may update the DSM bitmap based on the one or more aligned zones and send the DSM bitmap to mapping table accelerator 611. Mapping table accelerator 611 may generate response 617, indicating that the logical range is processed responsive to the updating of the DSM bitmap. For example, mapping table accelerator 611 may generate response 617 indicating that the logical range is deallocated from the logical space of non-volatile memory device 604, responsive to the updating of the DSM bitmap. Mapping table accelerator 611 may forward response 617 to host interface 618, causing host interface 618 to send response 617 to the host.

Afterward, mapping table accelerator 611 may be configured to update L2P mapping table 612 based on the DSM bitmap to actually deallocate the one or more aligned zones (e.g., to actually deallocate the one or more aligned zones from the logical space of non-volatile memory device 604). That is, mapping table accelerator 611 may identify the one or more aligned zones from the DSM bitmap, and update L2P mapping table 612 based on the one or more aligned zones to deallocate the one or more aligned zones. For example, mapping table accelerator 611 may identify one or more bits each having the second value from the DSM bitmap, and determine the one or more aligned zones to be one or more logical zones corresponding to the one or more bits. Mapping table accelerator 611 may identify a first list of logical addresses within the one or more logical zones, and invalidate the first list of logical addresses in L2P mapping table 612.

To invalidate the first list of logical addresses in L2P mapping table 612, mapping table accelerator 611 may determine a list of entries from L2P mapping table 612 that correspond to the first list of logical addresses, and modify each of the entries to have a predetermined value "X" (e.g., X can be any suitable value, which is not limited herein). By setting an entry of L2P mapping table 612 to be the predetermined value "X," a logical address corresponding to the entry can be marked as an invalid logical address in L2P mapping table 612. For example, with reference to FIG. 7 again, value 706 of a first entry of L2P mapping table 612 is modified from "PPA0" to the predetermined value "X," which indicates that a logical address "0" associated with the first entry of L2P mapping table 612 is marked as an invalid logical address and is deallocated. Similarly, value 706 of a second entry of L2P mapping table 612 is modified from "PPA1" to the predetermined value "X," which indicates that a logical address "1" associated with the second entry of L2P mapping table 612 is marked as an invalid logical address and is deallocated.

Referring back to FIG. 6, in some implementations, response 617 may be generated and sent to the host after the updating of the DSM bitmap, but before the updating of the L2P mapping table based on the DSM bitmap (e.g., before the actual deallocation of the one or more aligned zones). In this case, a response time for the DSM command can be shortened since the deallocation of the one or more aligned zones can be performed in the background after response 617 is sent to the host. Response latency for the DSM command can be decreased, and the impact of the DSM operation on the host read/write I/O latency can also be reduced. In some other implementations, response 617 may be generated and sent to the host after the updating of the L2P mapping table based on the DSM bitmap. In this case, the one or more aligned zones are already deallocated when response 617 is sent to the host.

Consistent with some implementations of the present disclosure, the set of deallocation zones may include one or more second deallocation zones which are classified into one or more unaligned zones, respectively. Mapping table accelerator 611 may update L2P mapping table 612 based on the one or more unaligned zones. That is, mapping table accelerator 611 may identify a second list of logical addresses within the one or more unaligned zones, and invalidate the second list of logical addresses in L2P mapping table 612. For example, mapping table accelerator 611 may modify a list of entries of L2P mapping table 612 that correspond to the second list of logical addresses to have the predetermined value "X." Then, mapping table accelerator 611 may generate response 617 responsive to the updating of L2P mapping table 612 based on the one or more unaligned zones. In some implementations, response 617 may be generated and sent to the host after the updating of L2P mapping table 612 based on the one or more unaligned zones (e.g., after the one or more unaligned zones are already deallocated).

Consistent with some implementations of the present disclosure, the set of deallocation zones may include both of (1) one or more first deallocation zones, which are classified into one or more aligned zones, respectively; and (2) one or more second deallocation zones which are classified into one or more unaligned zones, respectively. In this case, deallocation accelerator 610 may update the DSM bitmap based on the one or more aligned zones. Mapping table accelerator 611 may update L2P mapping table 612 based on the one or more unaligned zones, so that the one or more unaligned zones can be deallocated from the logical space of non-volatile memory device 604. Mapping table accelerator 611 may generate response 617 indicating that the logical range is deallocated from the logical space of non-volatile memory device 604 responsive to both (1) the updating of the DSM bitmap by deallocation accelerator 610 and (2) the updating of L2P mapping table 612 based on the one or more unaligned zones. Mapping table accelerator 611 may forward response 617 to host interface 618, causing host interface 618 to send response 617 to the host. Further, mapping table accelerator 611 may update L2P mapping table 612 based on the DSM bitmap, so that the one or more aligned zones can also be deallocated from the logical space of non-volatile memory device 604.

In some implementations, response 617 may be generated and sent to the host after (1) the DSM bitmap is updated by deallocation accelerator 610 and (2) L2P mapping table 612 is updated by mapping table accelerator 611 based on the one or more unaligned zones, but before L2P mapping table 612 is further updated based on the DSM bitmap. In this case, the deallocation of one or more aligned zones (through the updating of L2P mapping table based on the DSM bitmap) is not yet performed when response 617 is sent to the host. Instead, the deallocation of the one or more aligned zones can be performed in the background after response 617 is sent to the host. Thus, the response time for the DSM command can be shortened. Response latency for the DSM command can be decreased, and the impact of the DSM handling on the read/write I/O latency can also be reduced. In some other implementations, response 617 may be generated and sent to the host after (1) the updating of L2P mapping table based on the one or more unaligned zones and (2) the updating of L2P mapping table 612 based on the DSM bitmap. In this case, the one or more aligned zones (as well as the one or more unaligned zones) are already deallocated when response 617 is sent to the host.

With reference to FIG. 6 again, an example implementation of the disclosed DSM handling scheme is provided herein. Initially, memory controller 601 (e.g., deallocation accelerator 610 of memory controller 601) may split a logical space of non-volatile memory device 604 into a plurality of logical zones. Each logical zone may have a size of 16 MiB (or any other suitable value). Memory controller 601 (e.g., deallocation accelerator 610 of memory controller 601) may generate a DSM bitmap including a plurality of bits that correspond to the plurality of logical zones, respectively. Memory controller 601 (e.g., deallocation accelerator 610 of memory controller 601) may initiate the plurality of bits in the DSM bitmap to have a first value (e.g., "0").

Data classification accelerator 608 may receive, through host interface 618, a DSM command indicating a logical range to be deallocated. Data classification accelerator 608 may divide the logical range into a set of deallocation zones and classify each deallocation zone into either an unaligned zone or an aligned zone. If the set of deallocation zones includes one or more unaligned zones, mapping table accelerator 611 may update L2P mapping table 612 directly based on the one or more unaligned zones to deallocate the one or more unaligned zones. For example, mapping table accelerator 611 may identify logical addresses within the one or more unaligned zones and mark the logical addresses as invalid logical addresses in L2P mapping table 612. Mapping table accelerator 611 may generate response 617 after the updating of L2P mapping table 612 based on the one or more unaligned zones (e.g., after the one or more unaligned zones are deallocated).

If the set of deallocation zones includes one or more aligned zones, deallocation accelerator 610 may update the DSM bitmap based on the one or more aligned zones. For example, for each aligned zone, deallocation accelerator 610 may identify a logical zone of non-volatile memory device 604 that corresponds to the aligned zone, and update a bit corresponding to the logical zone to have a second value (e.g., "1") in the DSM bitmap. Mapping table accelerator 611 may generate response 617 responsive to the updating of the DSM bitmap. Afterward, mapping table accelerator 611 may further update L2P mapping table based on the DSM bitmap to actually deallocate the one or more aligned zones from the logical space of non-volatile memory device 604. That is, response 617 can be sent to the host after the updating of the DSM bitmap, but before the updating of L2P mapping table 612 based on the one or more aligned zones (e.g., before the actual deallocation of the one or more aligned zones from the logical space of non-volatile memory device 604). It is noted that the updating of L2P mapping table 612 based on one aligned zone may consume about 0.5 us, but the updating of the DSM bitmap for one aligned zone (e.g., setting one bit of the DSM bitmap corresponding to the aligned zone to have the second value "1") only costs about 2 ns. Thus, a response time for the DSM command can be shortened if response 617 is generated and sent to the host after the updating of the DSM bitmap, but before the updating of L2P mapping table 612 based on the one or more aligned zones.

If the set of deallocation zones includes both unaligned zones and aligned zones, deallocation accelerator 610 may update the DSM bitmap based on the aligned zones. Mapping table accelerator 611 may update L2P mapping table 612 based on the unaligned zones to deallocate the unaligned zones from the logical space of non-volatile memory device 604. Mapping table accelerator 611 may generate response 617 responsive to both (1) the updating of the DSM bitmap by deallocation accelerator 610 and (2) the updating of L2P mapping table 612 based on the unaligned zones. Mapping table accelerator 611 may forward response 617 to host interface 618, causing host interface 618 to send response 617 to the host. Further, mapping table accelerator 611 may update L2P mapping table 612 based on the DSM bitmap, so that the aligned zones can be deallocated from the logical space of non-volatile memory device 604 in the background after response 617 is sent. Thus, a response time for the DSM command can be shortened since response 617 is generated and sent to the host after (1) the updating of the DSM bitmap and (2) the updating of L2P mapping table 612 based on the unaligned zones, but before the updating of L2P mapping table 612 based on the aligned zones.

Figure 8A:
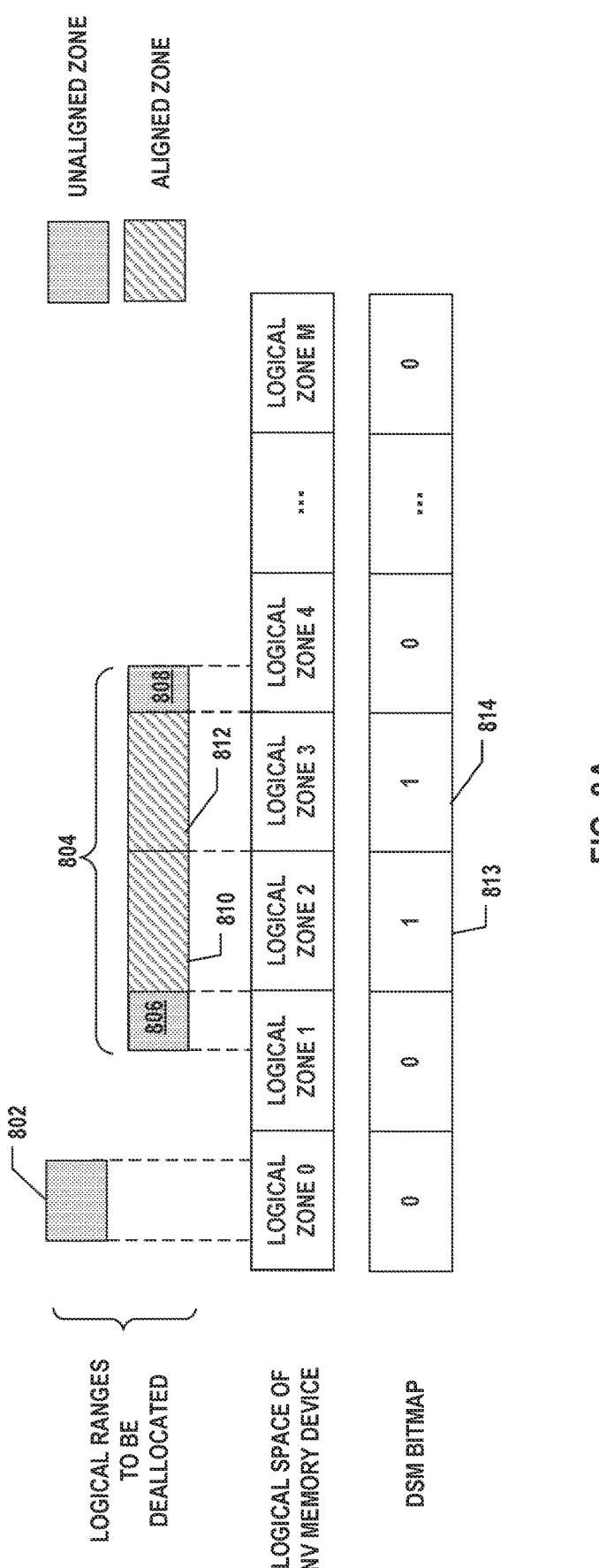
FIG. 8A illustrates an example of updating a DSM bitmap, according to some aspects of the present disclosure.

FIG. 8A illustrates an example of updating a DSM bitmap, according to some aspects of the present disclosure. In some implementations, a logical space of a non-volatile memory device can be divided into a plurality of logical zones (e.g., logical zones 0, 1, 2, . . . , M). M is a positive integer. A DSM bitmap can be generated for the plurality of logical zones, with each bit corresponding to a respective one of the logical zones to have a first value of "0."

As illustrated in FIG. 8A, a logical range 802 is to be deallocated from the logical space of the non-volatile memory device. Since logical range 802 is within (e.g., smaller than) a first logical zone (e.g., logical zone 0) of the plurality of logical zones, logical range 802 does not need to be split and is classified into an unaligned zone. Since an L2P mapping table can be updated directly based on the unaligned zone, the DSM bitmap of FIG. 8A does not need to be updated for the unaligned zone.

Another logical range 804 is also to be deallocated from the logical space of the non-volatile memory device. Logical range 804 can be divided into four deallocation zones to match a zone division of the logical space of the non-volatile memory device. The four deallocation zones are classified into two unaligned zones 806, 808 and two aligned zones 810, 812. For example, unaligned zone 806 is within a second logical zone (e.g., logical zone 1) of the plurality of logical zones. Aligned zone 810 is identical to a third logical zone (e.g., logical zone 2) of the plurality of logical zones. Aligned zone 812 is identical to a fourth logical zone (e.g., logical zone 3) of the plurality of logical zones. Unaligned zone 808 is within a fifth logical zone (e.g., logical zone 4) of the plurality of logical zones. The DSM bitmap can be updated based on aligned zones 810, 812. For example, a bit 813 corresponding to aligned zone 810 (equivalently, logical zone 2) can be set to have a second value of "1," and a bit 814 corresponding to aligned zone 812 (equivalently, logical zone 3) can be set to have the second value of "1."

Figure 8B:
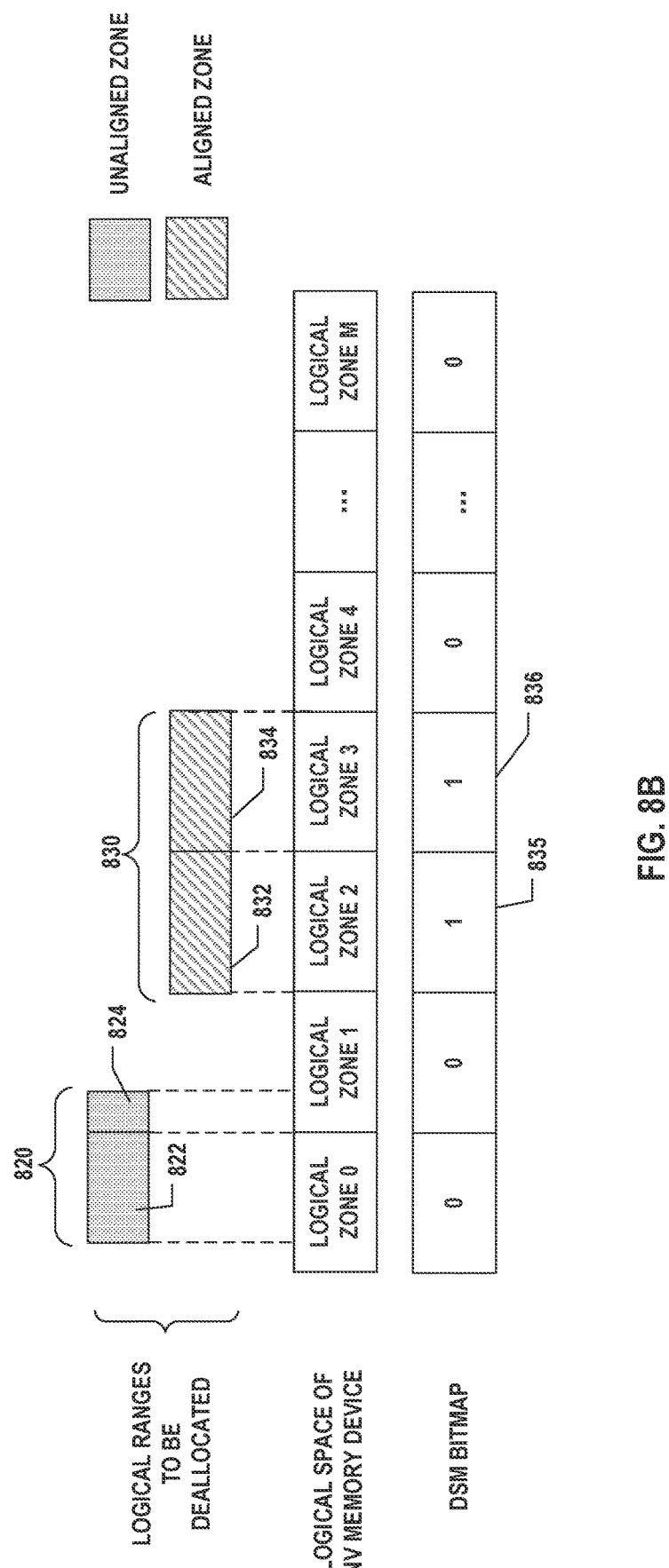
FIG. 8B illustrates another example of updating a DSM bitmap, according to some aspects of the present disclosure.

FIG. 8B illustrates another example of updating a DSM bitmap, according to some aspects of the present disclosure. Similar to FIG. 8A, a logical space of a non-volatile memory device can be divided into a plurality of logical zones (e.g., logical zones 0, 1, 2, . . . , M). A DSM bitmap is generated for the plurality of logical zones, with each bit corresponding to a respective one of the logical zones to have the first value of "0."

A logical range 820 is to be deallocated from the logical space of the non-volatile memory device. Logical range 820 can be divided into two deallocation zones to match a zone division of the logical space of the non-volatile memory device. The two deallocation zones are classified into two unaligned zones 822, 824. Unaligned zone 822 is within a first logical zone (e.g., logical zone 0) of the plurality of logical zones, and unaligned zone 824 is within a second logical zone (e.g., logical zone 1) of the plurality of logical zones. Since an L2P mapping table can be updated directly based on unaligned zones 822, 824, the DSM bitmap does not need to be updated for unaligned zones 822, 824.

Another logical range 830 is also to be deallocated from the logical space of the non-volatile memory device. Logical range 830 can be divided into two deallocation zones to match the zone division of the logical space of the non-volatile memory device. The two deallocation zones are classified into two aligned zones 832, 834. For example, aligned zone 832 is identical to a third logical zone (e.g., logical zone 2) of the plurality of logical zones. Aligned zone 834 is identical to a fourth logical zone (e.g., logical zone 3) of the plurality of logical zones. The DSM bitmap can be updated based on aligned zones 832, 834. For example, a bit 835 corresponding to aligned zone 832 (equivalently, logical zone 2) can be set to have the second value of "1," and a bit 836 corresponding to aligned zone 834 (equivalently, logical zone 3) can be set to have the second value of "1."

FIG. 9 illustrates a flowchart of a method 900 for operating a memory controller, according to some aspects of the present disclosure. The memory controller may be any suitable memory controller disclosed herein, such as memory controller 601. It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which a deallocated logical range (e.g., a logical range to be deallocated from a logical space of a non-volatile memory device) is divided into a set of deallocation zones. The deallocation zones include one or more first deallocation zones, which are classified into one or more aligned zones, respectively. For example, data classification accelerator 608 may divide the logical range into a set of deallocation zones which may include one or more aligned zones.

Method 900 proceeds to operation 904, as illustrated in FIG. 9, in which a DSM bitmap is updated based on the one or more aligned zones. For example, deallocation accelerator 610 may update the DSM bitmap based on the one or more aligned zones.

Method 900 proceeds to operation 906, as illustrated in FIG. 9, in which a response indicating that the deallocated logical range is processed is generated responsive to the updating of the DSM bitmap. For example, mapping table accelerator 611 may generate the response indicating that the deallocated logical range is deallocated from the logical space of the non-volatile memory device, responsive to the updating of the DSM bitmap.

Method 900 proceeds to operation 908, as illustrated in FIG. 9, in which the response is sent to a host. For example, mapping table accelerator 611 may forward the response to host interface 618, causing host interface 618 to send the response to the host.

FIG. 10 illustrates a flowchart of another method 1000 for operating a memory controller, according to some aspects of the present disclosure. The memory controller may be any suitable memory controller disclosed herein, such as memory controller 601. It is understood that the operations shown in method 1000 may not be exhaustive and that other operations can be performed as well before, after, or between any of the illustrated operations. Further, some of the operations may be performed simultaneously, or in a different order than shown in FIG. 10.

Referring to FIG. 10, method 1000 starts at operation 1002, in which a DSM command indicative of a logical range to be deallocated is received.

Method 1000 proceeds to operation 1004, as illustrated in FIG. 10, in which the logical range is divided into a set of deallocation zones, which includes (1) one or more first deallocation zones being classified into one or more aligned zones and (2) one or more second deallocation zones being classified into one or more unaligned zones.

Method 1000 proceeds to operation 1006, as illustrated in FIG. 10, in which a DSM bitmap is updated based on the one or more aligned zones.

Method 1000 proceeds to operation 1008, as illustrated in FIG. 10, in which an L2P mapping table is updated based on the one or more unaligned zones.

Method 1000 proceeds to operation 1010, as illustrated in FIG. 10, in which a response for the DSM command is generated. For example, the response can be generated responsive to both the updating of the L2P mapping table based on the one or more unaligned zones and the updating of the DSM bitmap. The response may be sent to a host.

Method 1000 proceeds to operation 1012, as illustrated in FIG. 10, in which the L2P mapping table is updated based on the DSM bitmap. It is understood that operation 1012 may be performed before or after operation 1010, which is not limited herein. In some implementations, operation 1012 can be performed in the background after the response is sent to the host.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 601 in FIG. 6. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory controller, comprising:
a data classification accelerator configured to receive a command indicative of a deallocated logical range from a host and divide the deallocated logical range into a set of deallocation zones, wherein the set of deallocation zones comprises one or more first deallocation zones which are classified into one or more aligned zones, respectively, and one or more second deallocation zones which are classified into one or more unaligned zones, respectively;
a deallocation accelerator operatively coupled to the data classification accelerator, and configured to update one or more bits of a dataset management (DSM) bitmap that correspond to the one or more aligned zones, respectively, from a first bit value to a second bit value to indicate that the one or more aligned zones are to be deallocated; and
a mapping table accelerator operatively coupled to the data classification accelerator and the deallocation accelerator, and configured to:
  update a logical-to-physical (L2P) mapping table based on the one or more unaligned zones to deallocate the one or more unaligned zones;
  responsive to the updating of the one or more bits of the DSM bitmap and the deallocating of the one or more unaligned zones, generate a response before the one or more aligned zones are deallocated, the response indicating that the deallocated logical range is processed; and
  send the response to the host after the one or more unaligned zones are deallocated but before the one or more aligned zones are deallocated.

2. The memory controller of claim 1, wherein the mapping table accelerator is further configured to update the L2P mapping table based on the DSM bitmap.

3. The memory controller of claim 2, wherein to update the L2P mapping table based on the DSM bitmap, the mapping table accelerator is further configured to:
  identify the one or more aligned zones based on the one or more bits of the DSM bitmap; and
  update the L2P mapping table based on the one or more aligned zones.

4. The memory controller of claim 3, wherein to update the L2P mapping table based on the one or more aligned zones, the mapping table accelerator is further configured to:
  identify a first list of logical addresses within the one or more aligned zones; and
  invalidate the first list of logical addresses in the L2P mapping table.

5. The memory controller of claim 1, wherein to update the L2P mapping table based on the one or more unaligned zones, the mapping table accelerator is further configured to:
  identify a second list of logical addresses within the one or more unaligned zones; and
  invalidate the second list of logical addresses in the L2P mapping table.

6. The memory controller of claim 1, wherein the data classification accelerator is configured to divide the deallocated logical range into the set of deallocation zones based on a zone division of a logical space of a non-volatile memory device coupled to the memory controller, such that the division of the deallocated logical range matches the zone division of the logical space of the non-volatile memory device.

7. The memory controller of claim 6, wherein:
the logical space of the non-volatile memory device is divided into a plurality of logical zones;
the one or more first deallocation zones are equal to one or more first logical zones from the plurality of logical zones, respectively, such that the one or more first deallocation zones are classified into the one or more aligned zones which are aligned with the one or more first logical zones, respectively; and
the one or more second deallocation zones are smaller than one or more second logical zones from the plurality of logical zones, respectively, such that the one or more second deallocation zones are classified into the one or more unaligned zones that are unaligned with the one or more second logical zones, respectively.

8. The memory controller of claim 6, wherein the non-volatile memory device comprises NAND Flash memory.

9. A memory system, comprising:
a non-volatile memory device; and
a memory controller operatively coupled to the non-volatile memory device and configured to control the non-volatile memory device, the memory controller comprising:
  a data classification accelerator configured to receive a command indicative of a deallocated logical range from a host and divide the deallocated logical range into a set of deallocation zones, wherein the set of deallocation zones comprises one or more first deallocation zones which are classified into one or more aligned zones, respectively, and one or more second deallocation zones which are classified into one or more unaligned zones, respectively;
  a deallocation accelerator operatively coupled to the data classification accelerator, and configured to update one or more bits of a dataset management (DSM) bitmap that correspond to the one or more aligned zones, respectively, from a first bit value to a second bit value to indicate that the one or more aligned zones are to be deallocated; and
  a mapping table accelerator operatively coupled to the data classification accelerator and the deallocation accelerator, and configured to:
    update a logical-to-physical (L2P) mapping table based on the one or more unaligned zones to deallocate the one or more unaligned zones;
    responsive to the updating of the one or more bits of the DSM bitmap and the deallocating of the one or more unaligned zones, generate a response before the one or more aligned zones are deallocated, the response indicating that the deallocated logical range is processed; and
    send the response to the host after the one or more unaligned zones are deallocated but before the one or more aligned zones are deallocated.

10. The memory system of claim 9, wherein the mapping table accelerator is further configured to update the L2P mapping table based on the DSM bitmap.

11. The memory system of claim 10, wherein to update the L2P mapping table based on the DSM bitmap, the mapping table accelerator is further configured to:
  identify the one or more aligned zones based on the one or more bits of the DSM bitmap; and
  update the L2P mapping table based on the one or more aligned zones.

12. The memory system of claim 11, wherein to update the L2P mapping table based on the one or more aligned zones, the mapping table accelerator is further configured to:

identify a first list of logical addresses within the one or more aligned zones; and invalidate the first list of logical addresses in the L2P mapping table.

13. The memory system of claim 9, wherein to update the L2P mapping table based on the one or more unaligned zones, the mapping table accelerator is further configured to:

identify a second list of logical addresses within the one or more unaligned zones; and invalidate the second list of logical addresses in the L2P mapping table.

14. The memory system of claim 9, wherein the data classification accelerator is configured to divide the deallocated logical range into the set of deallocation zones based on a zone division of a logical space of the non-volatile memory device coupled to the memory controller, such that the division of the deallocated logical range matches the zone division of the logical space of the non-volatile memory device.

15. The memory system of claim 14, wherein:

the logical space of the non-volatile memory device is divided into a plurality of logical zones;

the one or more first deallocation zones are equal to one or more first logical zones from the plurality of logical zones, respectively, such that the one or more first deallocation zones are classified into the one or more aligned zones which are aligned with the one or more first logical zones, respectively; and the one or more second deallocation zones are smaller than one or more second logical zones from the plurality of logical zones, respectively, such that the one or more second deallocation zones are classified into the one or more unaligned zones that are unaligned with the one or more second logical zones, respectively.

16. The memory system of claim 14, wherein the non-volatile memory device comprises NAND Flash memory.

17. A method for operating a memory controller, comprising:

receiving a command indicative of a deallocated logical range from a host;

dividing the deallocated logical range into a set of deallocation zones, wherein the set of deallocation zones comprises one or more first deallocation zones which are classified into one or more aligned zones, respectively, and one or more second deallocation zones which are classified into one or more unaligned zones, respectively;

updating one or more bits of a dataset management (DSM) bitmap that correspond to the one or more aligned zones, respectively, from a first bit value to a second bit value to indicate that the one or more aligned zones are to be deallocated;

updating a logical-to-physical (L2P) mapping table based on the one or more unaligned zones to deallocate the one or more unaligned zones;

responsive to the updating of the one or more bits of the DSM bitmap and the deallocating of the one or more unaligned zones, generating a response before the one or more aligned zones are deallocated, the response indicating that the deallocated logical range is processed; and sending the response to the host after the one or more unaligned zones are deallocated but before the one or more aligned zones are deallocated.

18. The method of claim 17, further comprising updating the L2P mapping table based on the DSM bitmap.

19. The method of claim 18, wherein updating the L2P mapping table based on the DSM bitmap comprises:

identifying the one or more aligned zones based on the one or more bits of the DSM bitmap; and updating the L2P mapping table based on the one or more aligned zones.

20. The method of claim 19, wherein updating the L2P mapping table based on the one or more aligned zones comprises:

identifying a first list of logical addresses within the one or more aligned zones; and invalidating the first list of logical addresses in the L2P mapping table.

* * * * *